United States Patent [19]

Ritchey

[11] 4,195,635
[45] Apr. 1, 1980

[54] EAR TAG INSTALLING TOOL

[76] Inventor: Eugene B. Ritchey, Rte. 3, Box 58, Brighton, Colo. 80601

[21] Appl. No.: 909,044

[22] Filed: May 24, 1978

[51] Int. Cl.² ............................................. A61B 17/00
[52] U.S. Cl. ..................................................... 128/330
[58] Field of Search ................... 128/330, 329 R, 347; 40/300, 301, 302; 30/286, 124, 343; 119/135

[56] References Cited

U.S. PATENT DOCUMENTS

| | | | |
|---|---|---|---|
| 2,382,304 | 8/1945 | Foltz et al. ............................... | 30/343 |
| 3,208,452 | 9/1965 | Stern .................................. | 128/329 X |
| 3,987,570 | 10/1976 | McMurray et al. ............. | 128/330 X |
| 4,000,744 | 1/1977 | Ritchey ................................. | 128/330 |

*Primary Examiner*—Robert W. Michell
*Assistant Examiner*—Michael H. Thaler
*Attorney, Agent, or Firm*—Sheridan, Ross, Fields & McIntosh

[57] ABSTRACT

An improved tool for piercing the skin of an animal and inserting a loopless identification tag of the type having a base connected to an anchoring head by a narrow neck portion. The tool comprises a handle having a palm engaging portion for thrusting the tool through the animal's skin and further includes an integral pointed and sharpened skin piercing blade attached to the handle by a long narrow shank. A sliding element comprises a pair of generally parallel rods extending along opposite sides of the shank and joined at their forward ends by a yoke extending under and partially encircling the blade. The sliding element is movable from an extended position with the yoke encircling the blade to a retracted position in which the rods slide into the handle and the yoke is adjacent the forward end of the handle. To insert a tag, it is positioned with the ears of the anchoring head extending into variable length slots formed between the shank and the parallel rods. The blade then is quickly thrust through the skin of an animal and the yoke is moved rearwardly upon contact with the skin of the animal causing the ears to be folded over each other and to be cammed out of the slot as they pass through the incision in the ear so that they are released from the tool and unfold whereupon the tag remains securely locked in the ear as the tool is withdrawn.

8 Claims, 15 Drawing Figures

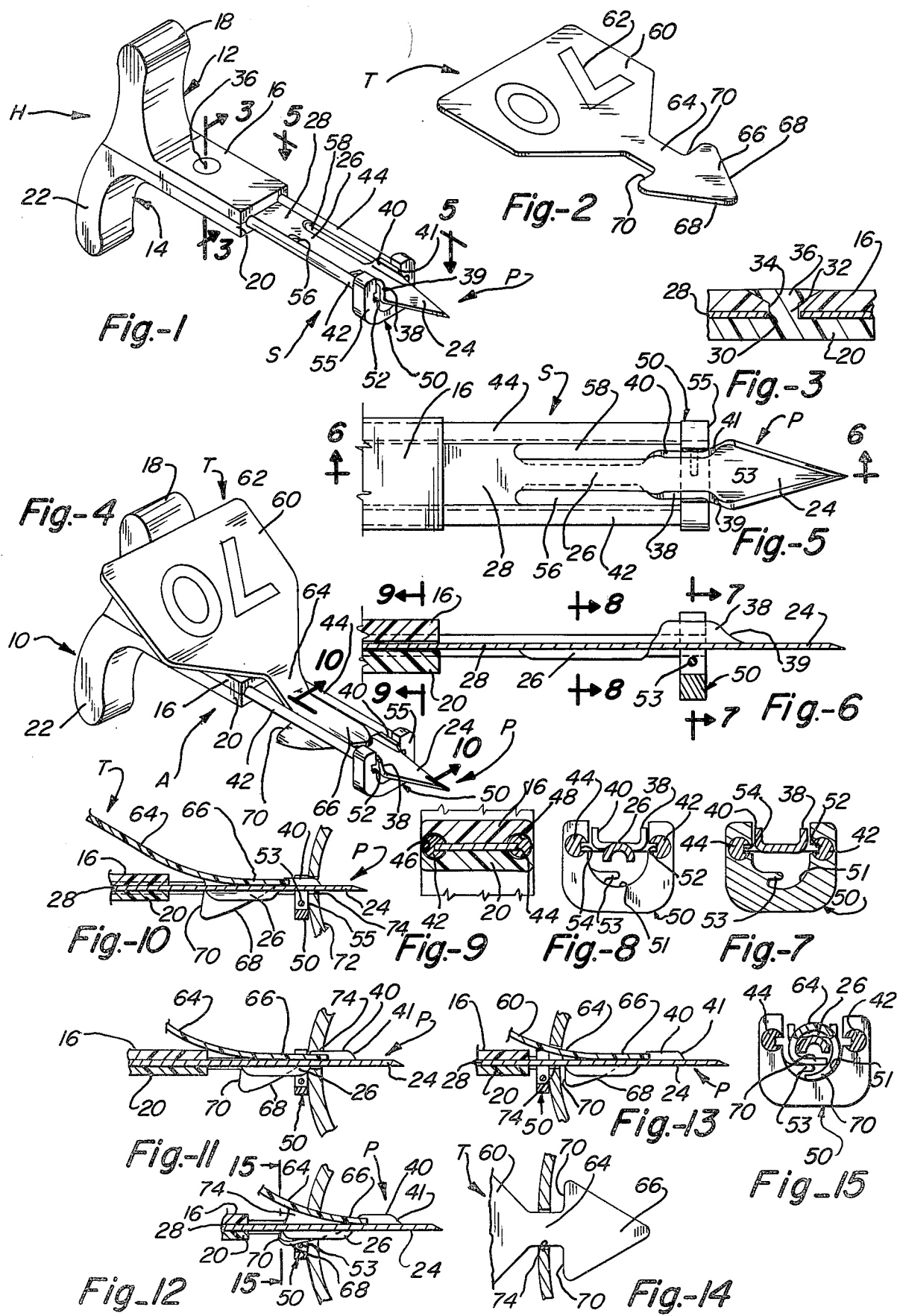

EAR TAG INSTALLING TOOL

BACKGROUND OF THE INVENTION

1. Field of the Invention

This invention relates to a tool for applying tags to various elements and is more particularly directed to such a tool for applying tags to the ears of animals such as cattle and sheep. Such tags may be marked with indicia to indicate identity or ownership or classification of any type.

2. Description of the Prior Art

A tag which has gained wide acceptance for this purpose is disclosed in U.S. Pat. No. 3,552,051 to Eugene B. Ritchey. This tag is molded or stamped from a flat sheet of resilient elastomeric material such as polyurethane and includes a laterally extensive base for bearing indicia and an anchoring head, having the general plan form of an arrowhead with a narrow leading end and rearwardly diverging locking flanges, joined to the base by a narrow neck. Several devices for installing the tags on the animals have been developed. For example, a tool is disclosed in the above-identified patent wherein the wings are folded or rolled together and the head is inserted into the rear end of a tubular applying tool having a piercing point at its forward end. The tool is then pushed through the ear and gripped on the far side and pulled through the ear and away from the head. The wings expand on the far side and anchor the tag, leaving the base exposed on the first side.

Another tool is disclosed in U.S. Pat. No. 3,916,904 to Eugene B. Ritchey which also requires folding or rolling the ears of the tag for positioning in a tool. It has been found that with both of these devices some installers have difficulty in rolling or bending the ears or wings of the tag and this is a particular problem in cold weather when the tag become stiff.

Still another tool is disclosed in U.S. Pat. No. 3,850,360 to Eugene B. Ritchey wherein a tag is forced downwardly between a pair of locking jaws which bend the ears or wings of the tag into a rolled configuration. Although this tool works satisfactorily, it has a number of moving parts and therefore is relatively expensive for general use.

A further tool is disclosed in U.S. Pat. No. 4,000,744 to Eugene B. Ritchey which discloses a number of tools for applying this tag in which the locking flanges or wings of the locking head are inserted in slots. This overcomes the difficulty in bending the tag but even with this tool experience has shown that some installers have difficulty in centering the tag between the ears whereupon the tip of the locking head may be displaced from its desired position causing the tag to be stripped from the tool as the tool is thrust through the ear requiring a further operation to get the tag into the slit which has been made by the tool.

SUMMARY OF THE INVENTION

In accordance with this invention, an improved tool is provided for installing an ear tag which has a blade connected by a narrow shank to a handle member. Slot means are formed along both sides of the shank for receiving the ears of a tag to be installed and means are provided for varying the length of the slot means so that as the piercing point of the blade passes through the element to be tagged the change in the length of the slots causes the tag to be folded and to be cammed out of the slots on the opposite side of the element to be tagged and to resiliently spring into open positions so that the tag is secure in the incision which has been made by the blade. The tool can then be removed by pulling it back through the slot. Conveniently, the blade is also provided with upturned ears which spread the incision so that the locking head can easily pass through the incision.

More particularly, the invention contemplates a blade having a piercing point and connected by means of a narrow shank to a handle. A pair of spaced rods are slidably mounted within the handle and extend parallel to the shank and are spaced on each side thereof to form a pair of slots. The forward ends of the rods are interconnected by a curved yoke. A pin extends from one side of the yoke toward the center. When the point of the blade is thrust through the skin of an animal to form an incision, the yoke engages the surface of the skin and is pushed rearwardly so that the rods slide backwardly along the shank thereby reducing the length of the slots between the yoke and the shank causing the tapered surfaces of the arrowhead shaped locking head to be cammed upwardly along the surface of the yoke. Simultaneously, the pin folds one locking flange of the locking head over tightly and the curved surface on the other side of the yoke folds the other locking flange over the one locking flange so that the locking head with the locking flanges folded can pass through the incision. This action causes the locking head to be released from the tool on the opposite side of the ear or skin of the animal whereupon the flanges resiliently open to lock the tag in the ear. As the locking blade is thrust through the ear, upwardly extending flanges on the rear portion of the blade separate the incision to receive the tip of the locking head so that it can pass through the incision.

Thus, the advantages of this invention are readily apparent. A very simply constructed tool has been provided which works efficiently and quickly to install an ear tag.

Additional advantages of this invention will be readily apparent from the description which follows taken in conjunction with the accompanying drawings.

BRIEF DESCRIPTION OF THE DRAWINGS

FIG. 1 is a perspective view of a tool constructed in accordance with this invention;

FIG. 2 is a perspective view of a tag adapted for use with the tool of FIG. 1;

FIG. 3 is an enlarged fragmentary vertical section, taken along line 3—3 of FIG. 1 showing how the handle halves are interconnected;

FIG. 4 is a perspective view, similar to FIG. 1 but showing a tag in place in the tool prior to installation;

FIG. 5 is an enlarged fragmentary plan view, taken along line 5—5 of FIG. 1 showing details of the piercing blade and sliding element arrangement;

FIG. 6 is a longitudinal section, taken along line 6—6 of FIG. 5 showing further details of the blade and sliding element arrangement;

FIG. 7 is an enlarged vertical section, taken along line 7—7 of FIG. 6;

FIG. 8 is an enlarged vertical section, taken along line 8—8 of FIG. 6;

FIG. 9 is an enlarged section, taken along line 9—9 of FIG. 6;

FIG. 10 is a slightly enlarged longitudinal section, taken along line 10—10 of FIG. 4, but showing the position of the tool after the piercing point of the blade has made an incision in an ear to be tagged;

FIG. 11 is a longitudinal section, similar to FIG. 10 but showing the blade passed almost entirely through the incision and the yoke beginning to move rearwardly to shorten the length of the slots;

FIG. 12 is a longitudinal section, similar to FIGS. 10 and 11, but showing the yoke pushed further rearwardly so that the locking edges of the locking head are being cammed out of the slots as the locking head passes through the incision;

FIG. 13 is a longitudinal section, similar to FIGS. 10-12, but showing the locking head having passed entirely through the incision and the yoke moved to its rearmost position, the locking head having been completely released from the tool;

FIG. 14 is a section through an ear of an animal showing the tag in position in the incision after installation; and FIG. 15 is an enlarged vertical section, taken along line 15—15 of FIG. 12 showing the locking flanges folded over by the pin and yoke.

DESCRIPTION OF THE PREFERRED EMBODIMENT

In accordance with this invention, an installing tool is provided, as illustrated in FIG. 1, for installing an identification tag T, one form of which is illustrated in FIG. 2. It will be understood that other tag configurations may be installed with the novel tool of this invention, the tag shown being for illustrative purposes only.

The tool includes a handle H having an upper first half 12 and a lower second half 14 for receiving a reciprocal slide member S and for securely holding a piercing element P for installing tag T as will be more fully discussed below. The upper half 12 of handle H includes a generally flat horizontally extending plate 16 integrally formed with an upwardly and outwardly extending hand-engaging portion 18. This upper half 12 mates with lower half 14 which has a corresponding generally flat horizontal plate 20 and a downwardly and outwardly extending hand-engaging portion 22. The piercing element P includes a sharpened blade 24 which is connected by means of a narrow shank 26 extending rearwardly from the blade to a support strip 28 sandwiched between plates 16 and 20, as best seen in FIG. 3. Conveniently, strip 28 is provided with an aperture 30 through which a protrusion 32 which is formed integrally with lower plate 20 extends. Upper plate 16 has a corresponding aperture 34 through which this protrusion 32 extends. The upper portion of aperture 34 is enlarged so that during assembly the upper end of protrusion 32 can be heated and caused to flow to fill aperture 34 providing an enlarged head 36 which holds the upper half 12 and lower half 14 together. Conveniently, the piercing element P may be stamped from one piece of sheet metal. As will be apparent from FIGS. 1, 5 and 6, the rear end of blade 5 has upturned flanges 38 and 40 with leaking beveled faces 39 and 41, respectively for separating the incision to facilitate insertion of the anchoring head, as explained more fully below.

Slide S includes a pair of spaced elongated members such as rods 42 and 44 which are arranged in parallel relationship and slidably received in slide grooves 46 and 48 formed in upper plate 16 and lower plate 20 of handle H. The forward ends of rods 42 and 44 are interconnected by a generally U-shaped yoke 50 with an inner curved surface 51 from which extends a pin 53 for folding the locking head of the tag as described below. The yoke also has a front bearing surface 55 for moving the slide S from the extended position shown in FIG. 1 to a retracted position during insertion of the tag, as also described below. Conveniently, rods 42 and 44 are respectively provided with longitudinal guide grooves 52 and 54, which also extend through yoke 50 and provide guide means for guiding the rods along the edges of support strip 28 as yoke 50 is moved from its extended position to its retracted position. It will be noted that the forward movement of sliding elements will be limited by yoke 50 abutting blade 24 adjacent flanges 38 and 40.

Tag T, as best shown in FIG. 2, may be made of a resilient plastic material, such as polyurethane and includes a base 60 which may bear indicia, such as indicia 62 for any identification purpose. The base is connected by means of a narrow neck 64 to an anchoring head 66 which is illustrated as having a general plan form of an arrowhead. Conveniently, the anchoring head 66 is provided with divergent side edges 68 which terminate in outwardly extending locking ledges of flanges 70.

To install the tag T, it is inserted in the tool, when the slide element S is in its extended position, as best seen in FIG. 4 wherein the locking flanges are folded to extend downwardly through slots 56 and 58 formed between rod 42 and shank 26 and between rod 44 and shank 26, respectively. The tip of the arrowhead rests between flanges 38 and 40 on blade 24. The tag is installed by thrusting the blade through an element to be tagged, such as ear 72 shown in FIGS. 10-14 which forms an incision or slit 74. As seen in FIGS. 10 and 11, slit 74 is spread by flanges 38 and 40 as they engage and pass through the slit so as to provide a sufficiently high opening to receive the tip of anchoring head 66. At the same time, the forward face or surface 55 of yoke 50 engages the surface of the ear and is forced rearwardly during the thrusting movement. As seen in FIG. 11, the blade 24 moves completely through the ear with the anchoring head following therebehind and as yoke 50 moves rearwardly the length of slots 56 and 58 decrease, see FIG. 12. During this same movement, as best shown in FIG. 15 a first locking flange 70 is folded over tightly by pin 53 and the second locking flange is folded over the first one by curved surface 51 so that the locking head 66 can pass through incision 74. Simultaneously, the tapered edges 68 of anchoring head 66 rides up along the surface of yoke 50 so that the anchoring head is cammed out of the slots of the tool until it is completely released on the opposite side of the incision 74 as shown in FIG. 13. The tool is then withdrawn through the slit leaving the tag in place as shown in FIG. 14. The sliding element S will now be in retracted position and can be manually pulled out to the extended position of FIG. 1 for inserting another tag for insertion into another animal.

From the foregoing, the advantages of this invention are readily apparent. A tool has been provided which is of relatively simple construction yet very efficient in operation. The locking ledges or flanges of a tag can be easily and quickly placed into variable length slots within the tool by the installer. The tag can then be installed quickly by a single thrusting motion through the ear or other element to be tagged. This thrusting motion sequentially forms an incision in the ear, spreads the incision for acceptance of the tip of the anchoring head, folds the locking ledges over, causes the slots which hold the locking ledges to be reduced in length so that the anchoring head to be cammed out of the slots and freed from the fool after the locking head passes through the incision. The tool may then simply be withdrawn from the incision from the side on which it was inserted.

The invention has been described in detail with particular reference to a plurality of embodiments thereof, but it will be understood that variations and modifications can be affected within the spirit and scope of the invention.

I claim:

1. A hand tool for applying a tag to an element to be tagged, wherein the tag is of the type which is made of resilient elastomeric material and includes a laterally extensive base for receiving indicia, an anchoring head in the general plan form of an arrowhead with a narrow leading end or tip and rearwardly diverging locking flanges joined to the base by a narrow neck, said tool comprising:
   a flat sharpened blade for piercing the element to be tagged;
   a handle for holding said tool to thrust said blade through the element to be tagged to form an incision through which the head of the tag can pass;
   a narrow shank interconnecting said blade and said handle; and
   a sliding element movable between an extended position and a retracted position, said sliding element having:
   an elongated member on each side of said shank slidably received in said handle; and
   a U-shaped yoke having a front face and interconnecting the extending ends of said members and extending around a portion of said blade when said sliding element is in extended position, said shank and each of said members, together with said yoke forming a slot therebetween, said sliding element being movable from said extended position to said retracted position wherein said yoke is adjacent said handle, upon said front face of said yoke engaging said element to be tagged when said blade is thrust through the element to be tagged causing the locking flanges to be cammed out of said slots as they are shortened due to the movement of said sliding element from said extended position to said retracted position.

2. A tool, as claimed in claim 1, wherein said blade further includes
   a tapered point; and
   a flange extending upwardly on opposite sides of said blade rearwardly of said point for receiving the tip of the arrowhead therebetween and for separating the incision to allow passage of the arrowhead therethrough.

3. A tool, as claimed in claim 2, wherein said flanges have leading beveled faces for separating the incision.

4. A tool, as claimed in claim 1, wherein said yoke includes:
   a pin extending from one side inwardly toward the other side to fold one locking flange over tightly; and
   a curved surface on said yoke for curving the other locking flange over said one locking flange so that they can pass through the incision.

5. A hand tool for applying a tag to the skin of an animal, wherein the tag is of the type which is made of resilient elastomeric material and includes a laterally extensive base for receiving indicia, an anchoring head in the general plan form of an arrowhead with a narrow leading end or tip and rearwardly diverging locking flanges joined to the base by a narrow neck; said tool comprising:
   a flat sharpened blade having a point for piercing the skin to form an incision for receiving the tag and an upturned flange along each edge of said blade, rearwardly of said point for separating the incision so that the tip of the anchoring head can pass therethrough;
   a narrow shank interconnecting said blade and a handle for holding said tool, said shank terminating in a support strip within the handle;
   said handle comprising:
   a first half on one side of said support strip;
   a second half on the other side of said support;
   means interconnecting said halves so that said support strip is sandwiched therebetween; and
   a longitudinal slide groove formed in said halves on opposite side of said support strip, said grooves being generally parallel; and a sliding element comprising:
   a pair of rods slidably received in said respective grooves;
   a generally U-shaped yoke extending around a portion of said blade connected to the outer ends of said rods to form a sliding element which is movable from an extended position, in which said yoke is adjacent said upturned flanges of said blade forming slots between said shank and said rods for receiving the locking flanges of a tag, and a retracted position, in which said yoke is adjacent said handle, said sliding element being movable from said extended position to said retracted position upon engagement of said yoke with the skin of the animal upon thrusting the blade through the skin whereupon the length of the slots is shortened as the blade and anchoring head passes through the incision causing the locking flanges to be cammed out of said slots after passage through to incision releasing the anchoring head from the blade so that the blade can be withdrawn in a reverse direction through the incision.

6. A hand tool, as claimed in claim 5, wherein said rods each include:
   longitudinal guide groove running along the inner edge thereof for receiving the edge of said support strip which serves as a guide for said sliding member.

7. A hand tool, as claimed in either claims 5 or 6, wherein:
   said yoke abuts said blade adjacent said flanges when in extended position to limit the forward movement of said sliding element.

8. A hand tool, as claimed in claim 5, wherein said yoke includes:
   a pin extending from one side inwardly toward the other side to fold one locking flange over tightly; and
   a curved surface on said yoke for curving the other locking flange over said one locking flange so that they can pass through the incision.

* * * * *